(12) United States Patent
Schaffer et al.

(10) Patent No.: US 9,090,839 B2
(45) Date of Patent: Jul. 28, 2015

(54) METHOD AND APPARATUS FOR ADJUSTABLY TREATING A SOUR GAS

(71) Applicant: Air Products and Chemicals, Inc., Allentown, PA (US)

(72) Inventors: Charles Linford Schaffer, Houston, TX (US); Andrew David Wright, Guildford (GB); Kevin Boyle Fogash, Wescosville, PA (US); Jeffrey William Kloosterman, Allentown, PA (US); Jeffrey Raymond Hufton, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 178 days.

(21) Appl. No.: 13/954,203

(22) Filed: Jul. 30, 2013

(65) Prior Publication Data

US 2013/0315794 A1 Nov. 28, 2013

Related U.S. Application Data

(62) Division of application No. 12/844,000, filed on Jul. 27, 2010, now Pat. No. 8,518,356.

(51) Int. Cl.
*B01D 53/047* (2006.01)
*B01D 53/62* (2006.01)
(Continued)

(52) U.S. Cl.
CPC ............... *C10K 1/004* (2013.01); *C01B 3/501* (2013.01); *C01B 3/506* (2013.01); *C01B 3/56* (2013.01);
(Continued)

(58) Field of Classification Search
CPC ............. B01D 53/047; B01D 2256/16; B01D 2257/304; B01D 2257/504; C10K 1/004; C01B 3/501; C01B 3/506; C01B 3/56; C01B 3/58; C01B 2203/0405; C01B 2203/043; C01B 2203/046; C01B 2203/0475; C01B 2203/0485
USPC .............. 96/108, 121; 95/136, 139, 140; 422/187; 423/220, 230, 242.1, 244.01, 423/244.09, 246
See application file for complete search history.

(56) References Cited

U.S. PATENT DOCUMENTS 4,356,161 A 10/1982 McNamara et al.
4,781,731 A 11/1988 Schlinger
(Continued)

FOREIGN PATENT DOCUMENTS

EP 0 005 572 A1 11/1978
EP 0 486 174 A1 5/1992
(Continued)

OTHER PUBLICATIONS

U.S. Dept. of Energy, "Wabash River Coal Gasification Repowering Project: A DOE Assessment." DOE/NETL-2002/1164, published Jan. 2002.
(Continued)

*Primary Examiner* — Frank Lawrence
(74) *Attorney, Agent, or Firm* — Willard Jones, II; Amy Carr-Trexler

(57) ABSTRACT

A feed gas comprising $CO_2$, $H_2S$ and $H_2$ is treated to produce an $H_2$-enriched product and an $H_2S$-lean, $CO_2$ product. The feed gas is separated to provide the $H_2$-enriched product and a stream of sour gas. The stream of sour gas is divided into two parts, one of which is processed in an $H_2S$ removal system to form one or more streams of sweetened gas, and the other of which bypasses the $H_2S$ removal system, the stream(s) of sweetened gas and the sour gas bypassing the $H_2S$ removal system then being recombined to form the $H_2S$-lean, $CO_2$ product gas. The division of the sour gas between being sent to and bypassing the $H_2S$ removal system is adjusted responsive to changes in the $H_2S$ content of the sour gas, so as to dampen or cancel the effects of said changes on the $H_2S$ content of the $H_2S$-lean, $CO_2$ product gas.

6 Claims, 3 Drawing Sheets

(51) Int. Cl.
 *C10K 1/00* (2006.01)
 *C01B 3/50* (2006.01)
 *C01B 3/56* (2006.01)
 *C01B 3/58* (2006.01)

(52) U.S. Cl.
 CPC ............... *C01B 3/58* (2013.01); *B01D 53/047* (2013.01); *B01D 2256/16* (2013.01); *B01D 2257/304* (2013.01); *B01D 2257/504* (2013.01); *C01B 2203/043* (2013.01); *C01B 2203/045* (2013.01); *C01B 2203/0405* (2013.01); *C01B 2203/046* (2013.01); *C01B 2203/0475* (2013.01); *C01B 2203/0485* (2013.01)

(56) References Cited

U.S. PATENT DOCUMENTS

| | | | |
|---|---|---|---|
| 4,826,670 | A | 5/1989 | Hegarty |
| 5,122,351 | A | 6/1992 | Hardison |
| 5,248,321 | A | 9/1993 | Yang |
| 6,818,194 | B2 | 11/2004 | DeBerry et al. |
| 7,306,651 | B2 | 12/2007 | Cieutat et al. |
| 8,888,873 | B2 * | 11/2014 | Haik-Beraud et al. ............ 48/61 |
| 2004/0255778 | A1 * | 12/2004 | Reddy ................................ 95/96 |
| 2007/0122328 | A1 | 5/2007 | Allam et al. |
| 2007/0178035 | A1 | 8/2007 | White et al. |
| 2008/0173584 | A1 | 7/2008 | White et al. |
| 2008/0173585 | A1 | 7/2008 | White et al. |
| 2010/0000154 | A1 | 1/2010 | Adler et al. |
| 2010/0011955 | A1 | 1/2010 | Hufton et al. |
| 2010/0111824 | A1 | 5/2010 | Schlichting et al. |

FOREIGN PATENT DOCUMENTS

| | | |
|---|---|---|
| EP | 0444987 | 8/1993 |
| EP | 0581026 | 2/1994 |
| EP | 0633219 | 1/1995 |
| EP | 0798032 | 10/1997 |
| EP | 2 140 925 A1 | 1/2010 |
| GB | 1 470 950 A | 4/1977 |
| WO | 2009/065843 A2 | 5/2009 |

OTHER PUBLICATIONS

Zhang, et al; "Reactions between Hydrogen Sulfide and Sulfuric Acid: A Novel Process for Sulfur Removal and Recovery" Ind. Eng. Chem. Res. (2000), 39 p. 2505-2509.

Wang et al; "Kinetics of Reaction between Hydrogen Sulfide and Sulfide Dioxide in Sulfuric Acid Solutions." Ind. Eng. Chem. Res. (2002), 41; p. 4707-4713.

Wang et al; "Thermodynamics and Stoichiometry of Reactions between Hydrogen Sulfide and Concentrated Sulfuric Acic;" The Canadian Journal of Chemicals Engineering, vol. 81; Feb. 2003; p. 80-85.

Wang et al; "Mass-Transfer Characteristics for Gas-Liquid Reaction of H2S and Sulfuric Acid in a Packed Column;" Ind. Eng. Chem. Res. (2004) 43; p. 5846-5853.

Ockwig et al; "Membranes for Hydrogen Separation;" Chem Rev. (2007) 107, p. 4078-4110.

Shao et al; "Polymeric Membranes for the Hydrogen Economy: Contemporary Approaches and Prospects for the Future;" Journal of Membrane Science 327 (2009) p. 18-31.

Schaffer et al; U.S. Appl. No. 12/844,034, filed Jul. 27, 2010; "Method and Apparatus for Treating a Sour Gas".

* cited by examiner

METHOD AND APPARATUS FOR ADJUSTABLY TREATING A SOUR GAS

CROSS-REFERENCE TO RELATED APPLICATIONS

This is a divisional of application Ser. No. 12/844,000 filed on Jul. 27, 2010 and now issued as U.S. Pat. No. 8,513,356, which is incorporated herein by reference in its entirety.

BACKGROUND OF THE INVENTION

The present invention relates to methods and apparatus for separating a feed gas, comprising carbon dioxide ($CO_2$), hydrogen sulfide ($H_2S$) and hydrogen ($H_2$), to form an $H_2$-enriched product gas and a sour gas depleted in $H_2$ and enriched in $CO_2$ and $H_2S$ relative to the feed gas, and for adjustably treating said sour gas to produce an $H_2S$-lean, $CO_2$ product gas. The invention has particular application to the separation and treatment of sour syngas mixtures obtained from the gasification or reformation of carbonaceous feedstock.

The production of syngas via reforming or gasifying carbonaceous feedstock is well known. Where the feedstock contains sulfur, such as is often the case for solid (e.g. coal, petcoke) or heavy liquid (e.g. asphaltene) feedstocks for gasification, such processes result in an initial syngas stream containing hydrogen ($H_2$), carbon monoxide (CO), carbon dioxide ($CO_2$), hydrogen sulfide ($H_2S$) and, usually, other species such as methane ($CH_4$), carbonyl sulfide (COS) and carbon disulfide ($CS_2$). Commonly, the initial syngas mixture (crude syngas) is then subjected to further treatments. In particular, the initial syngas mixture may be subjected to a water-gas shift reaction, in which at least some of the CO present in the initial syngas mixture is converted to further $CO_2$ and $H_2$ by reaction with $H_2O$ in the presence of a suitable shift catalyst. This process can also result in further $H_2S$ being produced, via incidental conversion of other sulfur species (such as COS and $CS_2$) in the syngas during the water-gas shift reaction.

Due to concerns over greenhouse gas emissions, there is a growing desire to remove $CO_2$ from syngas prior to use of the remaining, $H_2$-enriched, product (comprising predominantly either $H_2$ or a mixture of $H_2$ and CO) as a combustion fuel or for chemicals production or refining applications. The $CO_2$ may be compressed, so as to be stored underground or used for enhanced oil recovery (EOR). $H_2S$ may also have to be removed from the syngas. If the $H_2$-enriched product is to be used for chemicals production or refining then $H_2S$, if present, could be a poison for these downstream processes. Equally, if the $H_2$-enriched product is to be combusted in a gas turbine to generate power then $H_2S$, if present, will be converted into $SO_x$ ($SO_2$ and $SO_3$), on which there are emission limits and which may, therefore, require removal from the combustion exhaust using expensive desulfurization technology. Equally, it may not be practical or permissible to store the $H_2S$ with the $CO_2$. Therefore a solution must likewise be found for cost effective removal of $H_2S$ from the $CO_2$ before pipeline transportation or geological storage.

The most commonly used commercial solution, currently, for capturing $CO_2$ and $H_2S$ from sour syngas mixture uses a physical solvent (i.e. liquid solvent) absorption process, also referred to as an acid gas removal (AGR) process, such as Selexol™ or Rectisol®, to selectively separate $H_2S$, $CO_2$ and product $H_2$ into different streams. The $H_2S$-rich stream, typically containing about 20-80 mole % $H_2S$, is further treated to produce sulfur, usually by a Claus process coupled with a tail gas treating unit (TGTU). The $CO_2$ stream is typically compressed to meet pipeline or storage specifications, and the product $H_2$ is either sent as fuel to a gas turbine for power generation, or can be further processed via pressure swing adsorption (PSA) to achieve a 'spec' purity (typically 99.99 mole % or higher) for refining applications. However, a disadvantage of such AGR processes is that they are both costly and have significant power consumption.

As mentioned above, the typical method of removing the $H_2S$ contained in the $H_2S$-rich stream obtained from the AGR process is via conversion to elemental sulfur using the Claus process. This process, as is well known, typically involves an initial thermal step followed by one or more catalytic steps. In the thermal step the $H_2S$-rich stream is reacted in a substoichiometric combustion at high temperatures to convert part of the $H_2S$ to $SO_2$. The oxidant (i.e. $O_2$) to $H_2S$ ratio during combustion is controlled so that in total one third of all $H_2S$ is converted to $SO_2$. This provides the correct 2:1 molar ratio of $H_2S$ to $SO_2$ for the subsequent catalytic steps. More specifically, in said subsequent catalytic steps, the 2:1 mixture of $H_2S$ to $SO_2$ obtained from the thermal step is reacted over a suitable catalyst (e.g. activated aluminium(III) or titanium (IV) oxide) to convert the $H_2S$ and $SO_2$ to elemental sulfur via the reaction $2H_2S + SO_2 \rightarrow \frac{3}{8}S_8 + 2H_2O$. The Claus process ordinarily achieves high (e.g. 94 to 97%) but not complete levels of sulfur recovery and thus, as noted above, a TGTU is often also employed to recover and/or remove the remaining $H_2S$ from the Claus process tailgas.

The Claus process is at its most economical when greater than 20 short tons per day (tpd) sulfur (about 18000 kg/day sulfur) is to be produced, and when the $H_2S$ concentration in the feed to the process is greater than 10 mole %, and more preferably greater than 20 mole %. For production rates of less than 20 tpd (18000 kg/day) sulfur and/or for feed streams that are more dilute in $H_2S$ concentration other, more economical, means of removing sulfur are generally preferred. Typically, these are catalyst-based processes that can be of the regenerable type or the 'once-and-done' scavenging type and require a varying degree of process complexity and operational cost depending on the processing conditions of the gas being treated. Typically, these processes are most suited for treating feeds with $H_2S$ concentrations of less than 5%, and for processes where less than 20 tpd (18000 kg/day) is to be produced (although larger units have been designed and built). These processes are typically capable of removing 99% or more of the $H_2S$ from the feed. Industry accepted examples of such $H_2S$ disposition technologies include the LO-CAT and Stretford processes.

Specific examples of known prior art processes for separating $H_2S$, and/or other sulfur containing compounds, from a mixture include the following.

US-A1-2007/0178035, the disclosure of which is incorporated herein by reference, describes a method of treating a gaseous mixture comprising $H_2$, $CO_2$ and at least one combustible gas selected from the group consisting of $H_2S$, CO and $CH_4$. The gaseous mixture, which may be obtained from the partial oxidation or reforming of a carbonaceous feedstock, is separated, preferably by pressure swing adsorption (PSA), to produce a separated $H_2$ gas and a crude $CO_2$ gas comprising the combustible gas(es). The crude $CO_2$ gas is then combusted in the presence of $O_2$ to produce heat and a $CO_2$ product gas comprising the combustion product(s) of the combustible gas(es). The heat from at least a portion of the $CO_2$ product gas is recovered by indirect heat exchange with the separated $H_2$ gas or a gas derived therefrom. Where the combustible gas is, or includes, $H_2S$, the combustion products will include $SO_2$ and $SO_3$ ($SO_x$). In one embodiment, the $SO_x$ is then removed by washing the $CO_2$ product gas with water to cool the gas and remove $SO_3$, and maintaining the cooled $SO_3$-free gas at elevated pressure in the presence of $O_2$, water and $NO_x$ to convert $SO_2$ and $NO_x$ to sulfuric acid and nitric acid, thereby obtaining an $SO_x$-free, $NO_x$-lean $CO_2$ gas.

The process described in this document therefore presents a sulfur disposition pathway in which the $H_2S$ in the sour tailgas stream leaving the PSA is ultimately converted to sulfuric acid after being combusted to form $SO_x$. This process presents a alternative to the conventional elemental sulfur disposition pathway and can, additionally, handle dilute $H_2S$ concentrations as well as varying total amounts of sulfur. However, market conditions could limit the economic viability of such a sulfur disposition pathway, as the acid produced from such a process may be unsalable or of sufficiently poor quality that costly neutralization and disposal may be required.

U.S. Pat. No. 6,818,194 describes a process for removing $H_2S$ from a sour gas, wherein the sour gas is fed to an absorber where the $H_2S$ is removed from the gas by a nonaqueous sorbing liquor comprising an organic solvent for elemental sulfur, dissolved elemental sulfur, an organic base which drives the reaction between $H_2S$ sorbed by the liquor and the dissolved sulfur to form a nonvolatile polysulfide which is soluble in the sorbing liquor, and a solubilizing agent which prevents the formation of polysulfide oil. The process further comprises adding $SO_2$ to the absorber to oxidize the polysulphide to elemental sulfur, thereby producing a more complete chemical conversion of $H_2S$ by reducing the equilibrium back-pressure of $H_2S$. The sweet gas from the absorber exits the process, and the sorbent stream is then cooled and fed to a crystallizer to crystallize enough of the sulfur to balance the amount of $H_2S$ previously absorbed.

In this process, the optimum molar ratio of $H_2S$ to $SO_2$ in the feed stream to the absorber is the same as that for the catalytic stage of the Claus process, i.e. 2:1. In one embodiment, the process is applied to a feed stream which already contains a 2:1 mole ratio of $H_2S$ to $SO_2$, such as where the feed stream is the tail gas of a Claus process which is operated so as to produce a tail gas with this composition. In another embodiment, the process may be applied to an $H_2S$ containing feed stream to which $SO_2$ is first added, so as to obtain the desired 2:1 ratio prior to the stream being flowed through the absorber vessel. One exemplified way in which this may be achieved is to split the feed stream into two streams, pass one of said streams through a catalytic oxidation reactor to convert at least some of the $H_2S$ contained therein to $SO_2$, and then recombine the streams.

U.S. Pat. No. 4,356,161 describes a process for reducing the total sulfur content of a high $CO_2$-content feed gas stream, comprising $CO_2$, $H_2S$ and COS. The feed gas is first passed to an absorption column where it is contacted with an a regenerable, liquid polyalkanolamine absorbent selective for $H_2S$. The unabsorbed gas stream, comprising $CO_2$ and COS and substantially free of $H_2S$ is then routed to a reduction step where it is combined with Claus off-gases and the COS reduced to $H_2S$. The treated gas is then passed to a second absorption column and the unabsorbed gas is vented to the atmosphere. The $H_2S$-rich solvent from both absorption columns is stripped in a common stripper and the $H_2S$-rich gas is passed to a Claus unit for conversion to elemental sulfur. The absorption process described in this document is commonly referred to in the industry as an 'acid gas enrichment' process.

U.S. Pat. No. 5,122,351 describes a refinement to the known LO-CAT and Stretford processes of removing $H_2S$ by conversion to elemental sulfur, whereby the catalytic polyvalent metal redox solution used in said processes is recovered and re-used. This is achieved by interposing a closed loop evaporator/condenser process in the sulfur washing/filtering/recovery process so that wash water used to purify the sulfur and any polyvalent metal redox solution recovered from the sulfur melter are fed to an evaporator to concentrate the redox solution to a concentration capable of effective absorption of $H_2S$, and the water evaporated in the evaporator is condensed as pure water for use in washing and/or filtering the recovered sulfur.

US-A1-2010/0111824 describes a process for producing $H_2$ from a hydrocarbonaceous feed such as refinery residues, petroleum, natural gas, petroleum gas, petcoke or coal. In the exemplified embodiment, a crude syngas comprising $H_2$, CO, $CO_2$ and $H_2S$, is formed by gasifying residue oils, quenching the raw syngas, and subjecting the quenched syngas to a water-gas shift reaction. The syngas is separated via PSA into an $H_2$ product and a tail gas enriched in $CO_2$ and containing also $H_2S$, $H_2$ and CO. The PSA tail gas is mixed with a Claus process tail gas and the mixture supplied to a tail gas cleaning stage that uses a liquid solvent such as MDEA or Flexsorb SE® to selectively wash out $H_2S$ from the gas mixture. $H_2S$ is then liberated from the solvent and added to the feed stream to the Claus process.

U.S. Pat. No. 5,248,321 describes a process for removing sulfur oxides from gaseous mixtures such as flue gases from power plants, smelter gases, and other gases emitted from various industrial operations. The process involves contacting the gaseous mixture with a non-functionalized polymeric sorbent which is essentially hydrophobic, such as styrenic polymers, which sorbent may be employed in a PSA system to selectively adsorb $SO_2$. The $SO_2$ rich desorption stream may be fed to a Claus reactor along with a suitable amount of $H_2S$ to produce elemental sulfur and water.

U.S. Pat. No. 7,306,651 describes the separation of a gas mixture comprising $H_2S$ and $H_2$ using the combination of a PSA unit with a membrane. The PSA separates the feed stream into an $H_2$ stream and two $H_2S$-rich streams. One $H_2S$-rich stream is recovered as a waste stream and the second is compressed and put through a membrane to remove the $H_2$. The $H_2S$ is then supplied to the PSA unit at pressure for rinsing and the $H_2$ returned to the PSA unit for purging. The gas mixture may, for example, be a stream obtained from a hydrodesulfurization process in a refinery. The $H_2S$-rich waste stream may be fed into one of the fuel/sour gas lines of the refinery.

EP-B1-0444987 describes the separation of $CO_2$ and $H_2S$ from a syngas stream produced by gasification of coal. The syngas stream, containing $H_2S$, is reacted with steam in a catalytic CO-shift reactor to convert essentially all the CO in the stream to $CO_2$. The shifted stream is sent to a PSA unit that adsorbs $CO_2$ and $H_2S$ in preference to $H_2$, to separate said stream into an $H_2$ product gas and a stream containing $CO_2$ and $H_2S$. The stream containing $CO_2$ and $H_2S$ is sent to a second PSA unit that adsorbs $H_2S$ in preference to $CO_2$, to provide a $CO_2$ product, stated to be of high purity, and a $H_2S$ containing stream, the latter being sent to a Claus unit for conversion of the $H_2S$ into elemental sulfur.

EP-A1-0633219 describes a process for removing sulfur compounds from a gas stream containing sulfur compounds, such as the off-gas from a Claus process. The process comprises the steps of: (a) converting the sulfur compounds to sulfuric acid, by combusting sulfur compounds other than $SO_2$ to form $SO_2$, and catalytically oxidizing $SO_2$ to $SO_3$, which then forms sulfuric acid in water; (b) separating the sulfuric acid from the gas stream; and (c) supplying the sulfuric acid into the thermal stage of a Claus process to allow the sulfuric acid to react with hydrogen sulfide to form elemental sulfur.

Similarly, U.S. Pat. No. 4,826,670 describes a process for improving an oxygen-enriched Claus process by introducing a sulfuric acid stream into the reaction furnace (thermal stage of the Claus process) to moderate oxygen-induced high temperatures which allow oxygen-enrichment and attendant throughput in the Claus process to higher levels.

Industries must strike a delicate balance when selecting technologies for processing sour feeds. A successful project must minimize capital and operating cost while ensuring the chosen technologies can appropriately and robustly meet ever tightening emissions standards. The final selection of $H_2S$ disposition technology can, as discussed above, depend on the concentration at which the $H_2S$ is present in the sour gas stream that is being treated. Where $CO_2$ is to be captured (either for underground storage or enhanced oil recovery), the presence of $H_2S$ in the $CO_2$ product presents regulatory concerns and careful design measures must be in place to ensure product purity is upheld. This becomes an even more complex problem when one considers that the amount of $H_2S$ in the sour gas stream can vary depending on feedstock variations, and variations in the process used to produce and/or separate out the sour gas. Significant variation in the amount of $H_2S$ may, in turn, lead to the $H_2S$ removal process becoming economically disadvantageous and/or to product purity and/or emission standards being compromised.

It is an object of embodiments of the present invention to provide methods and apparatus that allow for variations in the $H_2S$ content of the sour gas while meeting air emissions standards and/or $CO_2$ purity specifications and achieving cost advantages over conventional technologies for sour gas processing.

It is an object of embodiments of the present invention to provide methods and apparatus that are capable of processing sour gas streams from varying feedstocks with varying compositions.

BRIEF SUMMARY OF THE INVENTION

According to the first aspect of the present invention, there is provided a method for treating a feed gas, comprising $CO_2$, $H_2S$ and $H_2$, to produce an $H_2$-enriched product and an $H_2S$-lean, $CO_2$ product, the method comprising:

separating the feed gas to form a stream of $H_2$-enriched product gas and a stream of sour gas, the sour gas also comprising $CO_2$, $H_2S$ and $H_2$ but being depleted in $H_2$ and enriched in $H_2S$ and $CO_2$ relative to the feed gas;

dividing the stream of sour gas into two parts;

processing one part of said stream of sour gas in an $H_2S$ removal system to form one or more streams of sweetened gas, depleted in $H_2S$ and enriched in $CO_2$ relative to the feed gas;

bypassing the $H_2S$ removal system with the other part of said stream of sour gas; and combining said stream(s) of sweetened gas with said sour gas bypassing the $H_2S$ removal system to form a stream of $H_2S$-lean, $CO_2$ product gas;

wherein the division of the sour gas between being sent to and processed in the $H_2S$ removal system bypassing said system is adjusted responsive to changes in the $H_2S$ content of the sour gas, such that the proportion of the sour gas processed in the $H_2S$ removal system, as compared to bypassing said system, is increased if the $H_2S$ content rises and decreased if the $H_2S$ content drops.

According to a second aspect of the present invention, there is provided an apparatus for treating a feed gas, comprising $CO_2$, $H_2S$ and $H_2$, to produce an $H_2$-enriched product gas and an $H_2S$-lean, $CO_2$ product gas, the apparatus comprising:

a pressure swing adsorption (PSA) system for separating the feed gas to form a stream of $H_2$-enriched product gas and a stream of sour gas, the sour gas comprising $CO_2$, $H_2S$ and $H_2$ but being depleted in $H_2$ and enriched in $H_2S$ and $CO_2$ relative to the feed gas;

an $H_2S$ removal system for processing a part of the sour gas to form one or more streams of sweetened gas, depleted in $H_2S$ and enriched in the $CO_2$ relative to the feed gas;

conduit means for transferring a part of said sour gas into the $H_2S$ removal system and bypassing the $H_2S$ removal system with another part of said sour gas;

a valve system for adjustably controlling the division of said sour gas between being sent to the $H_2S$ removal system and bypassing said system; and conduit means for withdrawing one or more streams of sweetened gas from the $H_2S$ removal system and combining said stream(s) with the sour gas bypassing the $H_2S$ removal system to form $H_2S$-lean, $CO_2$ product gas.

DETAILED DESCRIPTION OF THE INVENTION

Figure 1:
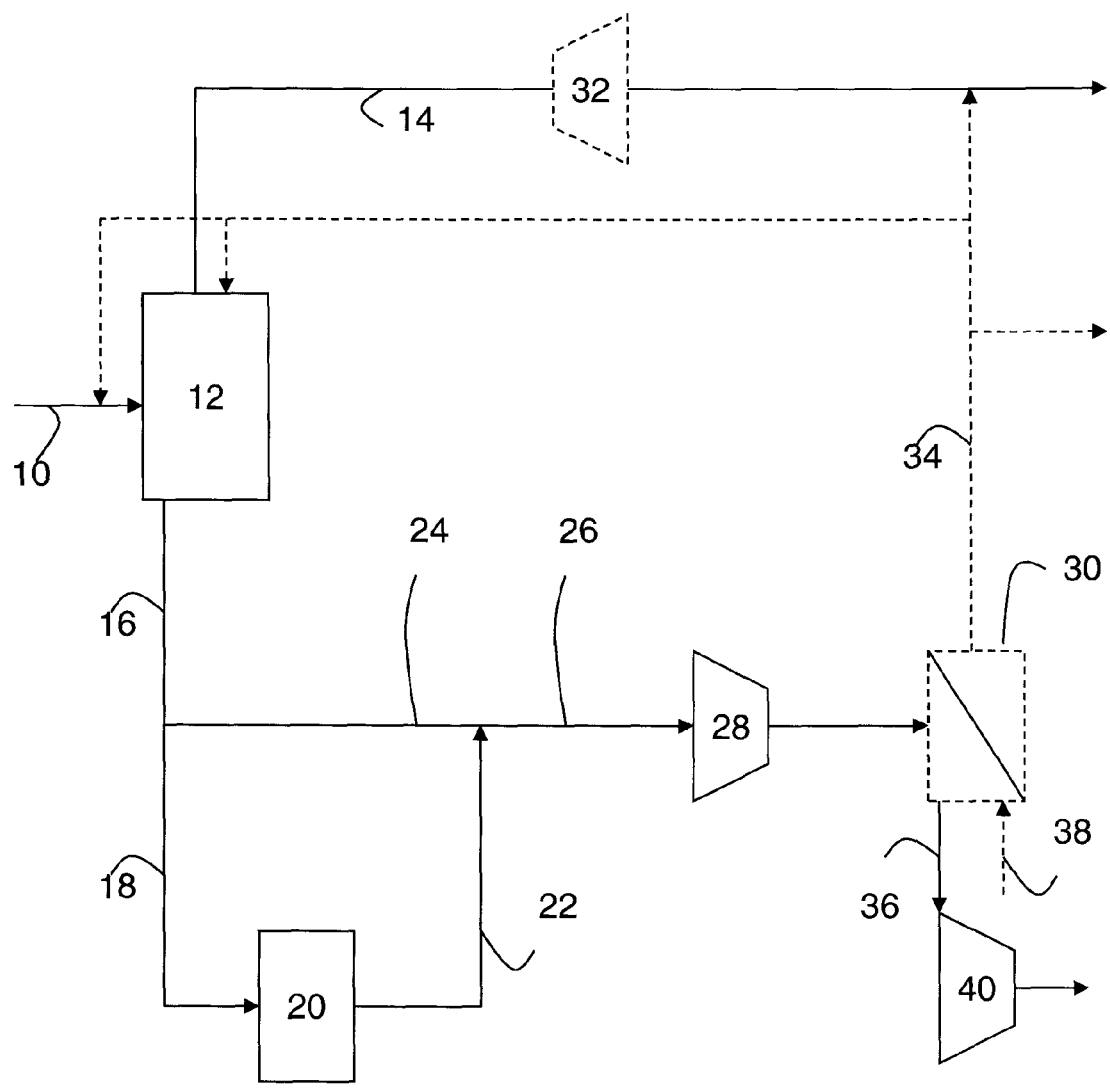
FIG. 1 is a flow sheet depicting an embodiment of the present invention.

The present invention provides a method and apparatus for treating a feed gas, comprising $CO_2$, $H_2S$ and $H_2$, to produce an $H_2$-enriched product and an $H_2S$-lean, $CO_2$ product. The method comprises:

separating the feed gas to form a stream of $H_2$-enriched product gas and a stream of sour gas, the sour gas also comprising $CO_2$, $H_2S$ and $H_2$ but being depleted in $H_2$ and enriched in $H_2S$ and $CO_2$ relative to the feed gas;

dividing the stream of sour gas into two parts;

processing one part of said stream of sour gas in an $H_2S$ removal system to form one or more streams of sweetened gas, depleted in $H_2S$ and enriched in $CO_2$ relative to the feed gas;

bypassing the $H_2S$ removal system with the other part of said stream of sour gas; and combining said stream(s) of sweetened gas with said sour gas bypassing the $H_2S$ removal system to form a stream of $H_2S$-lean, $CO_2$ product gas;

wherein the division of the sour gas between being sent to and processed in the $H_2S$ removal system and bypassing said system is adjusted responsive to changes in the $H_2S$ content of the sour gas, such that the proportion of the sour gas processed in the $H_2S$ removal system, as compared to bypassing said system, is increased if the $H_2S$ content rises and decreased if the $H_2S$ content drops.

The method therefore addresses the problem of separating and treating, both economically and while still allowing for variations in composition (in particular, $H_2S$ content), a sour gas as required to meet air emissions standards and/or $CO_2$ product purity specifications (e.g. for underground storage or EOR). This is achieved by bypassing the $H_2S$ removal system with part of the sour gas so that only part of sour gas is treated in the $H_2S$ removal system, and by adjusting the proportion of the sour gas treated in the $H_2S$ removal system responsive to variations in the $H_2S$ content of the sour gas (i.e. sending relatively more of the sour gas to the removal system and less to bypass when $H_2S$ content rises, and relatively less of the sour gas to the removal system and more to bypass when $H_2S$ content falls), so as to dampen or cancel the effect of said variations on the $H_2S$ content of the $H_2S$-lean, $CO_2$ product. In this way, the $H_2S$ content of the sour gas can still be reduced to a level necessary to meet air emissions standards and/or $CO_2$ product purity specifications during times of increased $H_2S$ content, while at the same time avoiding an unnecessary or "excessive" degree of $H_2S$ removal (and associated additional operating costs) when the $H_2S$ content of the sour gas is lower. Thus, emissions standards and/or product purity specifications are maintained while at the same time achieving a cost advantage.

As noted above, variations in upstream processes which could cause the composition of the sour gas to change include, but are not limited to, changes in the feedstock (e.g. coal, petcoke, asphaltenes) from which (e.g. by gasification or reforming) the feed gas (e.g. sour syngas mixture) is obtained, mal-performance or deterioration in an upstream unit (e.g. gasifier/reformer, water-gas shift unit, pressure swing adsorber or other separation device), or other process upsets. Variations in $H_2S$ content can be monitored using standard $H_2S$-analyzers, as will be known to one of ordinary skill in the art. $H_2S$ content may be monitored at any suitable location. For example, the $H_2S$ content of the sour gas stream may be monitored directly, by monitoring the content of this stream. Alternatively, it could be monitored indirectly, by monitoring the $H_2S$ content of the feed gas and/or $H_2S$-lean $CO_2$ product stream.

The term "sour", as used herein (and as is used in the art), refers to a gas or stream comprising $H_2S$. Likewise, the term "sweetened" or "sweet" refers to a gas or stream from which at least some of, and preferably substantially all or all of the $H_2S$ has been removed.

The feed gas comprises, as noted above, at least $CO_2$, $H_2S$ and $H_2$. The feed gas preferably comprises from about 10 to about 65 mole % $CO_2$, more preferably from about 10 to about 45 mole % $CO_2$. The feed gas preferably comprises up to about 3 mole %, or up to about 1.5 mole % $H_2S$, and preferably comprises at least about 50 ppm $H_2S$. The feed gas preferably comprises at least about 30 mole %, and more preferably at least about 50 mole % $H_2$. The feed gas is preferably a gaseous mixture obtained from gasification or reformation of a carbonaceous feedstock, and which may have been subjected to further processes such as, for example, a water-gas shift reaction (to convert some or all of the CO, present in the initially produced crude syngas, to $CO_2$ and $H_2$). Preferably, the feed gas is a sour syngas mixture (which, therefore, contains also at least some CO in addition to said $CO_2$, $H_2S$ and $H_2$). The feed gas may, for example, also contain: other carbonaceous species, such as $CH_4$; other sulfurous (i.e. sulfur containing) species, such as COS and $CS_2$; inerts, such as Ar and/or $N_2$; and/or water.

Where the feed gas contains also other sulfurous species (in addition to $H_2S$), it is preferred that these are dealt with in the method of the present invention in the same manner as $H_2S$. Thus, where for example a stream is indicated herein as being enriched in, depleted in, lean in or free of $H_2S$, said stream is preferably enriched in, depleted in, lean in or free of all other sulfurous species (where present) also; and where reference is made herein to $H_2S$ being adsorbed, removed or combusted then preferably other sulfurous species (where present) are adsorbed, removed or combusted also. In addition, where reference is made herein to maximum ppm or mole % of $H_2S$, preferably these represent also the maximum ppm or mole % of all sulfurous species (in total) in the gas or stream in question. Thus, for example, where the feed gas contains also other sulfurous species, the feed gas preferably comprises at most about 3 mole %, and more preferably at most about 1.5 mole % of sulfurous species (in total).

The $H_2$-enriched product gas is enriched in $H_2$ relative to the feed gas (i.e. it has a higher mole % of $H_2$ than the feed gas). It is also depleted in $H_2S$ and $CO_2$ relative to the feed gas (i.e. it has a lower mole % of $H_2S$ and a lower mole % of $CO_2$ than the feed gas). It is preferably free or at least substantially free of $H_2S$. For example, the $H_2$-enriched product gas preferably has an $H_2S$ concentration of less than about 20 ppm, more preferably less than about 10 ppm, and most preferably less than about 5 ppm. It may also be free or at least substantially free of $CO_2$. Where the feed gas contains also CO, the $H_2$-enriched product gas may be enriched in CO or depleted in CO (or, indeed, neither) relative to the feed gas, depending on the desired end use of said product. It is generally preferred, however, that where the feed stream contains more than minor amounts of CO then the $H_2$-enriched product gas is enriched in CO as well as $H_2$. Thus, it is generally preferred that it is only where the feed gas has a CO concentration of about 5 mole % or less, more preferably of about 2 mole % or less, and most preferably of about 1 mole % or less that the $H_2$-enriched product gas is not enriched in CO relative to the feed gas.

Preferably, the $H_2$ recovery in the $H_2$-enriched product gas (i.e. the percentage of the $H_2$ present in the feed gas that is recovered in the $H_2$-enriched product) is at least about 80%, more preferably at least about 85%, more preferably at least about 90%, and most preferably at least about 95%. Where the feed stream contains CO and it is desired that the $H_2$-enriched product is enriched in CO as well as $H_2$, the combined recovery of $H_2$ and CO in the $H_2$-enriched product (i.e. the percentage of $H_2$ and CO (in combination) present in the feed gas that is recovered in the $H_2$-enriched product) is preferably at least about 75%, more preferably at least about 80%, and most preferably at least about 90%. The percentage recovery in the $H_2$-enriched product gas of a component or combination of components can be calculated from the moles of the component or components in question in the feed gas and $H_2$-enriched product gas. Thus, if for example the feed gas were to contain 25 kmol/hr of $H_2$ and 25 kmol/hr of CO, and the $H_2$-enriched product gas were to comprise 23 kmol/hr of $H_2$ and 20 kmol/hr of CO, in this case 92% of the $H_2$ would be recovered in the $H_2$-enriched product stream and 86% of the $H_2$ and CO (in combination) would be recovered in the $H_2$-enriched product stream.

Preferably, the $H_2$-enriched product gas comprises at least about 90 mole $H_2$ or a mixture of $H_2$ and CO, and is free or at least substantially free of $H_2S$. The $H_2$-enriched product gas may, for example, comprise greater than about 90 mole % $H_2S$ as may be the case where the $H_2$-enriched gas is intended for use as a fuel for combustion and expansion in, for example, a gas turbine to generate power. Alternatively, the $H_2$-enriched gas may, for example, comprise greater than about 99.99 mole % $H_2$, as for example may be the case where the $H_2$-enriched gas is intended for use, without requiring further purification, for chemicals or refining applications. Alternatively still, the $H_2$-enriched gas may, for example, comprise at least about 90 mole %, and more preferably 95 mole % of a mixture of $H_2$ and CO, with a $CO:H_2$ ratio as desired for the product's intended application, such as a $CO:H_2$ ratio between about 1:3 and about 3:1, and more preferably from about 1:1 to about 1:2.5 (as, for example, may be desired in Fischer-Tropsch process).

The sour gas comprises, as noted above, $CO_2$, $H_2S$ and at least some $H_2$, although it is depleted in $H_2$ and enriched in $H_2S$ and $CO_2$ relative to the feed gas (i.e. has a lower mole % of $H_2$ and higher mole % of $H_2S$ and $CO_2$ than the feed gas). Preferably, the sour gas contains at most about 30 mole % $H_2$, and typically will contain at least about 5 mole % $H_2$. Preferably, the sour gas comprises at most about 6 mole %, and more preferably at most about 3 mole % or at most about 1 mole % $H_2S$, and preferably the sour gas comprises at least about 100 ppm and more preferably at least about 0.5 mole % $H_2S$. Preferably, the sour gas comprises at least about 80 mole $CO_2$. The sour gas may further comprise other carbonaceous species, such as CO and/or $CH_4$, and/or other sulfur containing species, such as COS and/or $CS_2$, as may have been present in the feed gas. Where CO and/or $CH_4$ are present in sour gas stream, the stream preferably comprises at most about 15 mole % of CO, $CH_4$ or the combination of the two.

The or each stream of sweetened gas, obtained from processing the sour gas in the $H_2S$ removal system to remove $H_2S$ therefrom, is as noted above depleted in $H_2S$ relative to the feed gas. As with the sour gas from which it or they are formed, the or each stream of sweetened gas is also enriched in $CO_2$, and depleted in $H_2$, relative to the feed gas. Preferably, the or each stream of sweetened gas free or substantially free of $H_2S$. Preferably, the $H_2S$ removal system removes at least about 90%, more preferably at least about 97%, and most preferably at least about 99% of the $H_2S$ present in the sour gas being processed in said system, such that the percentage of the $H_2S$ present in the sour gas that is recovered in the stream of sweetened gas or, where more than one stream is produced, in the streams in combination is preferably at most about 10%, more preferably at most about 3%, more preferably at most about 1% (the percentage recovery of $H_2S$ likewise being calculable from the moles of $H_2S$ present in the sour gas to be processed versus the moles of $H_2S$ present in the stream or combination of streams of sweetened gas). The stream of sour gas bypassing the $H_2S$ removal system is, self-evidently, not processed to remove $H_2S$ therefrom.

The $H_2S$-lean, $CO_2$ product gas preferably has an $H_2S$ concentration of at most about 200 ppm, more preferably at most about 100 ppm. Preferably, the $H_2S$-lean, $CO_2$ product gas has an $H_2$ concentration of at most about 4 mole %, more preferably at most about 1 mole %.

The feed gas is, in preferred embodiments, separated to form the stream of $H_2$-enriched product gas and stream of sour gas by pressure swing adsorption (PSA). The use of pressure swing adsorption to separate out the $H_2$-enriched product provides for both capital and operating cost savings and reduced power consumption as compared to use of liquid solvent absorption processes as used in the standard commercial arrangement (whereby, as described above, a liquid solvent absorption process is used to separate a feed into separate $H_2S$, $CO_2$ and $H_2$ streams, followed by treatment of the $H_2S$-rich stream in a Claus unit).

The PSA system in which the separation is carried out will comprise one or more types of adsorbent that selectively adsorb $CO_2$ and $H_2S$ (i.e. that adsorb $CO_2$ and $H_2S$ preferentially to $H_2$). If other sulfur containing species, such as COS and/or $CS_2$, are present in the feed gas then a PSA system is used which, preferably, comprises one or more types of adsorbent that selectively adsorb these additional sulfur containing species also. If CO and/or other carbon containing species are also present in the feed gas, then adsorbents that selectively adsorb some or all of these species may or may not be used, depending on the desired composition of the $H_2$-enriched product gas. Exemplary adsorbents include carbons, aluminas, silica gels and molecular sieves. For example, a single layer of silica gel may be used if the product requirement is a $H_2$/CO mixture, a single layer of silica gel or a silica gel/carbon split may be used if the required product is gas turbine grade $H_2$, and a silica gel/carbon/5A zeolite split may be used if the required product is high purity $H_2$. A suitable type of silica gel for use as an adsorbent is, for example, the high purity silica gel (greater than 99% $SiO_2$) described in US-A1-2010/0011955, the disclosure of which is incorporated herein by reference.

The system may comprise a plurality of adsorbent beds, as is known in the art. For example, the system may comprise a plurality of beds, with the PSA cycles of the individual beds being appropriately staggered so that at any point in time there is always at least one bed undergoing adsorption and at least one bed undergoing regeneration, such that the system can continuously separate the stream fed to it. The system may comprise beds arranged in series and/or in parallel. The PSA system may comprise a single type of adsorbent, selective for all the components that are to be selectively adsorbed by said system, or more than one type of adsorbent which adsorbents in combination provide the desired selective adsorption. Where more than one type of adsorbent is present, these may be intermixed and/or arranged in separate layers/zones of a bed, or present in separate beds arranged in series, or arranged in any other manner as appropriate and known in the art.

The PSA system may be operated in the same way as known PSA systems for separating $H_2$ from $CO_2$ (also referred to herein as $H_2$—PSA systems), with all known cycle options appropriate to this technology area (e.g. cycle and step timings; use, order and operation of adsorption, equalization, repressurisation, depressurization and purge steps; and so forth). The PSA cycle will, of course, typically include at least adsorption, blowdown/depressurisation and purge steps. During the adsorption step the feed gas is fed at superatmospheric pressure to the bed(s) undergoing the adsorption step and $CO_2$, $H_2S$ and any other species for which the adsorbent is selective are selectively adsorbed, at least a portion of the gas pushed through the bed(s) during this step forming all or at least a portion of the stream of $H_2$-enriched product gas. During the blowdown/depressurization and purge steps the pressure in the bed(s) is reduced and a purge gas passed through the bed(s) to desorb $CO_2$, $H_2S$ and any other species adsorbed in the previous adsorption step, thereby regenerating the bed(s) in preparation for the next adsorption step, at least a portion of the gases obtained from the blowdown and/or purge steps forming all or at least a portion of the stream of sour gas. Although, as noted above, the adsorbent used in the PSA system is selective for $CO_2$ and $H_2S$, due to the manner in which the PSA process operates some $H_2$ will nevertheless also be present in the sour gas (for example as a result of some $H_2$ also being adsorbed, being present in the void space of the bed(s), and/or being present in the gas(es) used to purge the bed(s)).

Suitable operating conditions for PSA systems are likewise known in the art. The adsorption step may, for example, be carried out by feeding the feed gas to the PSA system at a pressure of about 1-10 MPa (10-100 bar) absolute and at a temperature in the range of about 10-60° C., in which case the $H_2$-enriched product gas will be obtained at about the same pressure. The $H_2$-enriched product gas may, if desired, be expanded to produce power prior to said product gas being put to further use (e.g. in chemicals or refining applications).

The sour gas will typically be obtained at pressures about or slightly above atmospheric, i.e. about or slightly above 0.1 MPa (1 bar) absolute, but may for example also be obtained at pressures of up to about 0.5 MPa (5 bar) absolute or at subatmospheric pressures of down to about 0.01 MPa (0.1 bar) absolute (in this latter case the PSA system being a vacuum pressure swing adsorption system). Higher pressures for the blowdown and purge steps may also be employed if desired (although the performance of the PSA system will decrease where the base pressure of the PSA is higher, due to the dynamic capacity of the PSA system being decreased, the gas obtained from the blowdown and purge steps will be obtained at higher pressure, which may be beneficial where compression of these gases for further use is required). The gas used for purging can be preheated at least in part before use. If heating is used, then a typical temperature that the purge gas is raised to is in the range of about 150° C. to about 300° C.

In a preferred embodiment, the method is carried out using a fossil fuel fired gasification system integrated with a PSA system that separates the sour syngas stream produced by the gasifier (optionally after further process steps such as a water-gas shift reaction) to form the stream of $H_2$-enriched product gas and stream of sour gas.

The method may further comprise separating the stream of $H_2S$-lean, $CO_2$ product gas to form an $H_2S$-lean, $H_2$-lean, $CO_2$ product and a gas comprising $H_2$. Typically, the gas comprising $H_2$ is enriched in $H_2$ relative to the feed gas, and therefore constitutes a second $H_2$-enriched gas (the $H_2$-enriched product gas being the "first" $H_2$-enriched gas). Preferably, the $H_2S$-lean, $H_2$-lean, $CO_2$ product comprises at least about 98 mole %, more preferably at least about 99 mole %, more preferably at least about 99.9 mole % $CO_2$. Preferably, the gas comprising $H_2$ (second $H_2$-enriched gas) is at least about 60 mole %, more preferably at least about 70 mole % $H_2$. The gas comprising $H_2$ (second $H_2$-enriched gas) may be used in any other process where it would be of value. For example, depending on its composition the gas could be: blended with the $H_2$-enriched product gas (i.e. the "first" $H_2$-enriched gas) obtained via separation of the feed gas; recycled back to the system used to separate the feed gas (for example, where said system is a PSA system the gas comprising $H_2$ may be combined with the feed gas, separated in an additional adsorption step to provide a further portion of the $H_2$-enriched product gas and sour gas, used as a rinse gas in a rinse step of the PSA cycle, or used as a repressurisation gas in a repressurisation step of the PSA cycle); and/or used in one or more additional processes. The $H_2S$-lean, $H_2$-lean, $CO_2$ product may be compressed (or pumped) to sufficient pressure for sequestration or for use in EOR applications.

The $H_2S$-lean, $CO_2$ product gas may, for example, be separated to form the $H_2S$-lean, $H_2$-lean, $CO_2$ product and gas comprising $H_2$ (second $H_2$-enriched gas) by partial condensation or using membrane separation.

In the case of partial condensation, the $H_2S$-lean, $CO_2$ product gas is cooled and separated into a condensate and a vapour, for example using one or more phase separators and/or distillation columns. The heavier components, namely $CO_2$ and remaining $H_2S$, are concentrated in the liquid phase, which therefore forms the $H_2S$-lean, $H_2$-lean, $CO_2$ product, the gaseous phase forming the gas comprising $H_2$ (second $H_2$-enriched gas). Partial condensation systems that would be suitable for separating the $H_2S$-lean, $CO_2$ product gas are, for example, described in US-A1-2008/0173585 and US-A1-2008/0173584, the disclosures of which are incorporated herein by reference.

Where partial condensation is used, it is also important that water and other components that may freeze out (e.g. $NH_3$ and trace levels of tars) are not present in the stream of $H_2S$-lean, $CO_2$ product gas introduced into partial condensation system or are present only in sufficiently small amounts to avoid them freezing out and blocking the condensation system heat exchanger (which is used to cool the gas as necessary for subsequent separation into condensate and vapour) or otherwise affecting the performance of the condensation system. In order to remove water a drying system, such as a temperature swing adsorption (TSA) or absorptive (e.g. gycol, glycerol) system, may be used at any point upstream of the condensation system.

Where membrane separation is used, the $H_2S$-lean, $CO_2$ product gas may be separated using one or more membranes having selective permeability (i.e. that are more permeable to one or more components of the stream to be separated than they are to one or more other components of said stream). For example, membranes may be used that are permeable to $H_2$ but largely impermeable to $CO_2$ and/or vice versa, such as are described in Journal of Membrane Science 327 (2009) 18-31, "Polymeric membranes for the hydrogen economy: Contemporary approaches and prospects for the future", the disclosure of which is incorporated herein by reference. Where, for example, a membrane is used that is permeable to $H_2$ but is, in comparison, largely impermeable to $CO_2$ and $H_2S$, during the membrane separation process the $H_2S$-lean, $CO_2$ product gas is introduced (typically at elevated pressure) into the membrane separation system and separated by the membrane into the second $H_2$-enriched gas (obtained at a lower pressure from the permeate side of the membrane) and the $H_2S$-lean, $H_2$-lean, $CO_2$ product (obtained at elevated pressure from the upstream side of the membrane). A nitrogen 'sweep' stream may also be used to increase the driving force for separation, allowing the stream of $H_2$-enriched gas leaving the membrane separation system to be obtained at a higher pressure for the same membrane surface area. Membrane separation technologies are well documented in the literature and can be broadly classified as metallic, inorganics, porous carbons, organic polymers, and hybrids or composites (see, for example, Membranes for Hydrogen Separation, Nathan W. Ockwig and, Tina M. Nenoff, *Chemical Reviews* 2007 107 (10), 4078-4110, the disclosure of which is incorporated herein by reference). Polymer membranes constitute a preferred type of membrane for use in the present invention.

The $H_2S$ removal system may be a system of any type suitable for processing the sour gas to obtain the desired stream(s) of sweetened gas, and may comprise a single type of system or a combination of two or more different types of systems.

In one embodiment, the $H_2S$ removal system may, for example, comprise an adsorption system comprising one or more beds of adsorbent selective for $H_2S$, the processing of sour gas in the $H_2S$ removal system comprising passing sour gas through said beds of adsorbent to adsorb $H_2S$ therefrom and form said or one of said stream(s) of sweetened gas.

The bed or beds may comprise a single type of adsorbent or more than one type of adsorbent selective for $H_2S$ (i.e. that adsorb $H_2S$ in preference to $CO_2$). Preferably the system also comprises one or more adsorbents selective for any other sulfur containing species present in the sour gas (which adsorbents may be the same or different from the adsorbent(s) selective for $H_2S$, and may be present in the same or different beds of the system). The system may, for example, use adsorbent of a non-regenerable type, e.g. $H_2S$ scavengers such as iron sponge or ZnO, which are disposed of and replaced once saturated with $H_2S$ (although, in cases where the sour gas comprises greater than about 100 ppm $H_2S$ any non-regenerable adsorbents are preferably only used as a final polishing step of the $H_2S$ removal process, the $H_2S$ removal system therefore including also a regenerable adsorbent system or another type of $H_2S$ removal system that first removes the bulk of the $H_2S$ prior to removal of remaining $H_2S$ by the non-regenerable adsorbent). Use of method of the present invention in connection with such a system can reduce capital/operating costs by reducing the flow rate of sour gas that the bed(s) of regenerable adsorbent have to process and/or frequency with which the $H_2S$ scavenger has to be replaced.

In one embodiment, the $H_2S$ removal system may, for example, comprise a system that converts $H_2S$ to elemental sulfur, the processing of sour gas in the $H_2S$ removal system comprising contacting sour gas with a reagent (e.g. one or more catalysts and/or reactants) to convert $H_2S$ to elemental sulfur (which sulfur may then be removed by, for example, any suitable sulfur handling processes as are known in the art) and form said or one of said stream(s) of sweetened gas. Preferably, the $H_2S$ removal system comprises a catalyst that catalyses the conversion of $H_2S$ to elemental sulfur.

The system for converting $H_2S$ to elemental sulfur may, for example, be a system that converts the $H_2S$ to elemental sulfur by a direct oxidation or redox process (i.e., LO-CAT, Sulfa-Treat). These processes are well known in the industry and usually operate in three sections comprising a gas treating, a catalyst regeneration section, and a sulfur handling section. Use of such systems may be a preferred option where the sour gas stream typically comprises less than about 5%. Use of method of the present invention in connection with such a system can reduce costs by reducing operating costs associated with regenerating the catalyst (in the catalyst regeneration section), and also reducing the amount of sulfur that is removed thus reducing operating costs associated with the sulfur handling section.

Where the sour gas contains, in addition to $H_2S$, one or more other sulfur containing species, the method may further comprise treating a portion or all of the sour gas to be processed in the $H_2S$ to elemental sulfur conversion system to convert one or more of said sulfur containing species to $H_2S$ prior to said sour gas being processed in said conversion system. This may, in particular, be preferred where a higher $H_2S$ concentration is desirable for optimal performance of the conversion system in question. Alternatively or additionally, one or more other $H_2S$ and/or sulfur species containing gas streams, as may be available on-site or be imported from off-site, may be blended with the sour gas to be processed in the conversion system, again to increase the overall $H_2S$ concentration of said gas to be processed in the conversion system, where this may be desirable.

Other sulfur species that may be present in the sour gas include, in particular, and as described above, COS and $CS_2$. A variety of processes for converting such species to $H_2S$ are known, and may suitably be employed. For example, COS may be converted to $H_2S$ and $CO_2$ in the presence of alumina and/or titania catalysts via the hydrolysis reaction $COS+H_2O \rightarrow H_2S+CO_2$. $CS_2$ may be reduced to produce $H_2S$ via the reaction $CS_2+2H_2 \rightarrow 2H_2S+C$, which is generally favored at high temperatures and can proceed over a Co—Mo—Al catalyst. The aforementioned hydrolysis reaction is also favored at high temperatures.

In one embodiment, the $H_2S$ removal system may, for example, comprise a combustion system, wherein the processing of sour gas in the $H_2S$ removal system comprises combusting sour gas in the presence of $O_2$ to produce heat and a combustion effluent depleted in $H_2S$ and $H_2$, relative to the feed gas, and comprising $CO_2$, $SO_x$ and $H_2O$, $SO_x$ being removed from said combustion effluent to form (from the resulting $SO_x$-depleted combustion effluent) said or one of said stream(s) of sweetened gas. Use of method of the present invention in connection with such a system can reduce costs by reducing operating cost associated with the addition of a trim fuel (i.e. natural gas) which may necessarily or desirably be combusted alongside the sour gas to support combustion of the latter (in particular, where the latter is of low calorific value). The bypassing of the combustion system with part of the sour gas also allows for potential further recovery of hydrogen still present in that part of the sour gas (all or substantially all of the hydrogen sent to the combustion system typically being combusted to form water) which may likewise be of economic benefit.

The combustion system is preferably an oxy-fuel combustion system, whereby the sour gas is combusted via oxy-fuel combustion. As used herein, the term "oxy-fuel combustion" refers to combustion where the oxidant stream, that is mixed with the sour gas (constituting the fuel to be combusted) to provide the $O_2$ for combustion, comprises greater than 21 mole % oxygen. More preferably, the oxidant stream is at least about 90 mole % oxygen, and most preferably at least about 95 mole % oxygen. The oxidant stream may be oxygen enriched air, oxygen enriched recycled flue gas, or substantially pure or pure oxygen. Preferably all or at least substantially all of the $H_2S$, $H_2$ and any other combustible components present in the sour gas are combusted to form their combustion products ($SO_x$ and $H_2O$ in the case of $H_2S$, and $H_2O$ in the case of $H_2$). Preferably, therefore, the amount of $O_2$ provided by the oxidant stream is in excess of the stoichiometric amount theoretically required for complete combustion of all combustible components present in the sour gas to be combusted.

In this embodiment, the method preferably further comprises passing the combustion effluent through a heat exchanger to recover heat therefrom via indirect heat exchange. The recovered heat may be put to various uses. For example, the recovered heat may be used to generate steam (which may, for example, be used in turn in a steam turbine to generate power), supplied to other processes, and/or exchanged with other process streams.

Preferably, $SO_x$ is removed from said combustion effluent by cooling the combustion effluent to condense out water and convert $SO_3$ to sulfuric acid (typically, this will be carried out in a heat exchanger separate from any heat exchanger initially used to recover useful heat from the combustion effluent in the manner discussed above), and maintaining the cooled combustion effluent at elevated pressure(s), in the presence of $O_2$, water and optionally $NO_x$, for a sufficient time to convert $SO_2$ to sulfurous acid and/or $SO_2$ to sulfuric acid and $NO_x$ to nitric acid.

This process by which $SO_x$ is removed may, in particular, be a process as described in US-A1-2007/0178035, preferred features of this process being, therefore, as described in this document. In particular, at least substantially all (and usually all) of the $SO_x$ and the bulk, usually about 90%, of any $NO_x$ is preferably removed. The combustion effluent is usually produced at a pressure of from about 0.1 MPa (1 bar) to about 0.7 MPa (7 bar), and more typically from about 0.1 MPa (1 bar) to about 0.2 MPa (2 bar), depending at least in part on the pressure at which the sour gas stream is introduced into the combustion system, and may be compressed to the elevated pressure. The elevated pressure is usually at least about 0.3 MPa (3 bar) and preferably from about 1 MPa (10 bar) to about 5 MPa (50 bar). Contact time (or "hold-up") between the gaseous components and the liquid water after elevation of the pressure affects the degree of conversion of $SO_2$ to $H_2SO_4$ and $NO_x$ to $HNO_3$, a total "hold-up" time of no more than 60 seconds usually being sufficient for maximum conversion of $SO_2/NO_x$. Counter current gas/liquid contact devices such as columns or scrub towers allow intimate mixing of water with the gaseous components for continuous removal of $SO_2$ and $NO_x$, and thus constitute suitable devices for providing the required contact time for the conversion(s). The $O_2$ required for the conversions may be added although an amount of $O_2$ may be present in the combustion effluent, for example where a stoichiometric excess of $O_2$ was used during combustion. Water is present in the combustion effluent as one of the combustion products, but further water may be added if required. Likewise, $NO_x$ may already be present in the combustion effluent, and/or may be added as required.

In one embodiment, the $H_2S$ removal system may, for example, comprise both a combustion system and a system that converts $H_2S$ to elemental sulfur via reaction with $SO_2$, sulfuric acid and/or sulfurous acid. The sour gas to be processed in the $H_2S$ removal system is, in this case, divided into two streams, and said processing comprises:

contacting, in the $H_2S$ to elemental sulfur system, a stream of sour gas with the $SO_2$, sulfuric acid and/or sulfurous acid to convert $H_2S$ to elemental sulfur (which sulfur may then be removed by, for example, any suitable sulfur handling processes as are known in the art) and form said stream or one of said stream(s) of sweetened gas; and combusting, in the combustion system, another stream of sour gas in the presence of $O_2$ to produce heat and a combustion effluent depleted in $H_2S$ and $H_2$, relative to the feed gas, and comprising $CO_2$, $SO_x$ and $H_2O$, and: (i) introducing at least a portion of the combustion effluent, or an $SO_2$-enriched stream separated from the combustion effluent, into the $H_2S$ to elemental sulfur conversion system to provide at least a portion of said $SO_2$ for the reaction with $H_2S$; and/or (ii) converting $SO_x$ in the combustion effluent to sulfuric and/or sulfurous acid, and introducing at least a portion of said acid into the $H_2S$ to elemental sulfur conversion system to provide at least a portion of said acid for the reaction with $H_2S$.

The method according to this embodiment therefore has the further advantage, over the method described in US-A1-2007/0178035, that at least a portion of the $SO_x$ formed from combustion of $H_2S$ in the combustion system is disposed of either by conversion into elemental sulfur rather than by conversion to sulfuric acid, or by at least a portion of the sulfuric and/or sulfurous acid that is formed from the $SO_x$ being further converted to elemental sulfur.

As described above in connection with other embodiments where the $H_2S$ removal system comprises an $H_2S$ to elemental sulfur conversion system, where the sour gas contains in addition to $H_2S$ one or more other sulfur containing species the method may further comprise treating a portion or all of said stream of sour gas to be processed in said conversion system to convert one or more of said sulfur containing species to $H_2S$ prior to said stream being processed in the conversion system. Alternatively or additionally, one or more other $H_2S$ and/or sulfur species containing gas streams, as may be available on-site or be imported from off-site, may be blended with the sour gas stream to be processed in the conversion system, again to increase the overall $H_2S$ concentration of said gas to be processed in the conversion system.

As described above, in connection with other embodiments where the $H_2S$ removal system comprises a combustion system, the combustion system may preferably be an oxy-fuel combustion system, whereby the sour gas is combusted via oxy-fuel combustion. The method may preferably further comprise passing the combustion effluent through a heat exchanger to recover heat therefrom via indirect heat exchange. The recovered heat may be used to generate steam, supplied to other processes, and/or exchanged with other process streams. The recovered heat may, for example, be used to supply some or all of the thermal load that may be necessary for optimal conversion of $H_2S$ in the $H_2S$ to elemental sulfur conversion system and/or for optimal prior treatment of the sour gas feed to said conversion system to convert additional sulfur species to $H_2S$ (where such prior treatment takes place).

Where the $H_2S$ to elemental sulfur system converts $H_2S$ to elemental sulfur via reaction with $SO_2$, and a portion of the combustion effluent is introduced into said conversion system to provide at least a portion of said $SO_2$ for reaction with $H_2S$, the combustion effluent may be divided into at least two thereof, one of which is introduced into the conversion system to provide at least a portion of said $SO_2$ for the reaction with $H_2S$, and the other of which forms a second of said streams of sweetened gas.

Where the $H_2S$ to elemental sulfur system converts $H_2S$ to elemental sulfur via reaction with $SO_2$, the combustion effluent is separated to form an $SO_2$-enriched stream (i.e. stream enriched in $SO_2$ relative to the combustion effluent) and an $SO_2$-depleted stream (i.e. a stream depleted in $SO_2$ relative to the combustion effluent), and the $SO_2$-enriched stream is introduced into said conversion system to provide at least a portion of said $SO_2$ for reaction with $H_2S$, the $SO_2$-depleted stream may form a second of said streams of sweetened gas. The combustion effluent may be separated to form an $SO_2$-enriched stream and an $SO_2$-depleted stream via any suitable means. For example, the combustion effluent may be separated using suitable adsorbents (such as for example described in U.S. Pat. No. 5,248,321, the disclosure of which is incorporated herein by reference) or via distillation (for example using a system as described in EP-A-0798032, the disclosure of which is incorporated herein by reference).

By introducing into the $H_2S$ to elemental sulfur conversion system a separated $SO_2$-enriched stream, or only that amount of the combustion effluent required to provide the necessary amount of $SO_2$ for reaction with $H_2S$, and taking the $SO_2$-depleted stream or the remainder of the combustion effluent as an additional stream of sweetened gas, the amount of sour gas to be combusted in the combustion system relative to the amount treated in the conversion system can be increased without affecting the reaction stoichiometry in the conversion system. This, in turn, may allow additional useful heat to be generated by and recovered from the combustion reaction. However, in this case care should be taken to ensure that the amount of combustion effluent, or amount of any residual $SO_x$ in the $SO_2$-depleted stream, taken as an additional stream of sweetened gas is not such that the $SO_x$ content of the $H_2S$-lean, $CO_2$ product gas exceeds acceptable limits. Where, for example, the combustion effluent is being divided and a portion thereof taken as an additional stream of sweetened gas, it is therefore preferable that both the division of sour gas between the stream sent to the conversion system and the stream sent to the combustion system, and the division of the combustion effluent between being sent to the conversion system and being taken as an additional sweetened gas, are adjusted as necessary responsive to changes in the $H_2S$ content of the sour gas, such that both the reaction stoichiometry within the conversion system and the $SO_x$ content of the $H_2S$-lean, $CO_2$ product gas are maintained within desired limits.

Where the $H_2S$ to elemental sulfur system converts $H_2S$ to elemental sulfur via reaction with $SO_2$, the $H_2S$ to elemental sulfur system preferably comprises a catalyst that catalyses the conversion of $H_2S$ to elemental sulfur via reaction with $SO_2$. Suitable catalysts include, for example, catalysts as used in the catalytic step(s) of the Claus process.

Where the $H_2S$ to elemental sulfur conversion system converts $H_2S$ to elemental sulfur via reaction with sulfuric and/or sulfurous acid, $SO_x$ in the combustion effluent is converted to sulfuric and/or sulfurous acid, and at least a portion of said acid is introduced into the $H_2S$ to elemental sulfur conversion system to provide at least a portion of said acid for the reaction with $H_2S$, the $SO_x$-depleted combustion effluent (obtained following removal of the acid) may form a second of said streams of sweetened gas. Prior to being introduced in the $H_2S$ to elemental sulfur conversion system, the sulfuric and/or sulfurous acid stream may be heated to drive off excess water, thereby concentrating the acid before it is added to the conversion system. Such evaporation of water is preferably carried out at atmospheric pressure or under vacuum.

The $SO_x$ in the combustion effluent may be converted to sulfuric acid or sulfuric and sulfurous acid by cooling the combustion effluent to condense out water and convert $SO_3$ to sulfuric acid, and maintaining the cooled combustion effluent at elevated pressure(s), in the presence of $O_2$, water and optionally $NO_x$, for a sufficient time to convert $SO_2$ to sulfurous acid and/or $SO_2$ to sulfuric acid and $NO_x$ to nitric acid. The process by which $SO_x$ is converted to sulfuric acid may, in particular, be a process as described in US-A1-2007/0178035, preferred features of this process being, therefore, as described in this document and/or as described above in relation to other embodiments of the present invention where $SO_x$ in the combustion effluent is converted to sulfuric acid.

The conversion of $H_2S$ to elemental sulfur via reaction with sulfuric acid may proceed according to the reaction $3H_2S+H_2SO_4 \rightarrow 4S+4H_2O$, wherein aqueous $H_2SO_4$ is reacted with gaseous $H_2S$. Similarly, the conversion of $H_2S$ to elemental sulfur via reaction with sulfurous acid may proceed according to the reaction $2H_2S+H_2SO_3 \rightarrow 3S+3H_2O$, wherein aqueous $H_2SO_3$ is reacted with gaseous $H_2S$. Further details regarding the reaction between $H_2S$ and sulfuric acid are, for example, given in: Reactions between Hydrogen Sulfide and Sulfuric Acid: A Novel Process for Sulfur Removal and Recovery, Qinglin Zhang, Ivo G. Dalla Lana, Karl T. Chuang,† and, Hui Wang, *Industrial & Engineering Chemistry Research* 2000 39 (7), 2505-2509; Kinetics of Reaction between Hydrogen Sulfide and Sulfur Dioxide in Sulfuric Acid Solutions, *Ind. Eng. Chem. Res.* 2002, 41, 4707-4713; Thermodynamics and Stoichiometry of Reactions between Hydrogen Sulfide and Concentration Sulfuric Acid, *The Canadian Journal of Chemical Engineering*, Volume 81, February 2003; and Mass-Transfer Characteristics for Gas-Liquid Reaction of $H_2S$ and Sulfuric Acid in a Packed Column *Ind. Eng. Chem. Res.* 2004, 43, 5846-5853; the disclosures of which are incorporated herein by reference.

In any of the above embodiments, the method may further comprise processing one or more additional $H_2S$ containing streams in the $H_2S$ removal system alongside said part of said stream of sour gas to be processed in the $H_2S$ removal system. These additional streams may be derived from processes within the plant, or may be obtained from off-site. For example, where the feed gas is separated by pressure swing adsorption, the PSA system may produce two separate streams of sour gas (of, for example, different composition), with one of said streams being divided into two parts, one of which is sent to the $H_2S$ removal system and the other of which bypasses said system (as described above), and the other of said streams being processed, in its entirety, in the $H_2S$ removal system (alongside said part of said first mentioned stream). Where the two streams of sour gas are of different composition (as may be the case where, for example, one is formed from gas obtained during the blowdown step of the PSA process and the other is formed from gas obtained during the purge step), it may in particular be preferable to process all of the stream of higher $H_2S$ content (e.g. formed from the blowdown step) in the $H_2S$ removal system, and divide the stream of lower $H_2S$ content (e.g. formed from the purge step) into one part for processing in the $H_2S$ removal system and another part for bypassing said system.

Apparatus of the present invention are suitable for carrying out the above described method. The apparatus comprises:

a pressure swing adsorption (PSA) system for separating the feed gas to form a stream of $H_2$-enriched product gas and a stream of sour gas, the sour gas comprising $CO_2$, $H_2S$ and $H_2$ but being depleted in $H_2$ and enriched in $H_2S$ and $CO_2$ relative to the feed gas;

an $H_2S$ removal system for processing a part of the sour gas to form one or more streams of sweetened gas, depleted in $H_2S$ and enriched in $CO_2$ relative to the feed gas;

conduit means for transferring a part of said sour gas into the $H_2S$ removal system and bypassing the $H_2S$ removal system with another part of said sour gas;

a valve system for adjustably controlling the division of said sour gas between being sent to the $H_2S$ removal system and bypassing said system; and conduit means for withdrawing one or more streams of sweetened gas from the $H_2S$ removal system and combining said stream(s) with the sour gas bypassing the $H_2S$ removal system to form $H_2S$-lean, $CO_2$ product gas.

The apparatus may further comprise a separation system for receiving the $H_2S$-lean, $CO_2$ product gas and separating said gas to form an $H_2S$-lean, $H_2$-lean, $CO_2$ product and a gas comprising $H_2$ (preferably, a second $H_2$-enriched gas).

In one embodiment:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for converting $H_2S$ to elemental sulfur via reaction with $SO_2$, and (iii) conduit means for transferring at least a portion of the combustion effluent from the combustion system to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the combustion system formed from a portion of the combustion effluent.

In another embodiment:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving and separating the combustion effluent to form an $SO_2$-enriched stream and an $SO_2$-depleted stream (iii) a system for converting $H_2S$ to elemental sulfur via reaction with $SO_2$, and (iv) conduit means for transferring the $SO_2$-enriched stream from the system for separating the combustion effluent to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the system for separating the combustion effluent formed from the $SO_2$-depleted stream.

In another embodiment:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving combustion effluent from the combustion system, converting $SO_x$ in said effluent to sulfuric acid and/or sulfurous acid, and separating said acid from the effluent to form an $SO_x$-depleted combustion effluent, (iii) a system for converting $H_2S$ to elemental sulfur via reaction with sulfuric and/or sulfurous acid, and (iv) conduit means for transferring sulfuric and/or sulfurous acid from the $SO_x$ to acid conversion system to the $H_2S$ to elemental sulfur conversion system to provide sulfuric and/or sulfurous acid for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the $SO_x$ to sulfuric and/or sulfurous acid conversion system formed from the $SO_x$-depleted effluent.

The system for converting $SO_x$ to sulfuric and/or sulfurous acid may, for example, comprise a cooling system for cooling the combustion effluent to condense out water and convert $SO_3$ to sulfuric acid, a compressor for elevating the pressure of the cooled combustion effluent, and a counter current gas/liquid contact device for washing the cooled combustion effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

Further preferred features and embodiments of the apparatus according to the invention will be apparent from the foregoing description of preferred features and embodiments of the method of the invention.

Aspects of the invention include:

1. Apparatus for treating a feed gas, comprising $CO_2$, $H_2S$ and $H_2$, to produce an $H_2$-enriched product gas and an $H_2S$-lean, $CO_2$ product gas, the apparatus comprising:

a pressure swing adsorption (PSA) system for separating the feed gas to form a stream of $H_2$-enriched product gas and a stream of sour gas, the sour gas comprising $CO_2$, $H_2S$ and $H_2$ but being depleted in $H_2$ and enriched in $H_2S$ and $CO_2$ relative to the feed gas;

an $H_2S$ removal system for processing a part of the sour gas to form one or more streams of sweetened gas, depleted in $H_2S$ and enriched in $CO_2$ relative to the feed gas;

conduit means for transferring a part of said sour gas into the $H_2S$ removal system and bypassing the $H_2S$ removal system with another part of said sour gas;

a valve system for adjustably controlling the division of said sour gas between being sent to the $H_2S$ removal system and bypassing said system; and conduit means for withdrawing one or more streams of sweetened gas from the $H_2S$ removal system and combining said stream(s) with the sour gas bypassing the $H_2S$ removal system to form $H_2S$-lean, $CO_2$ product gas.

2. An apparatus according to #1, wherein the apparatus further comprises a separation system for receiving the $H_2S$-lean, $CO_2$ product gas and separating said gas to form an $H_2S$-lean, $H_2$-lean, $CO_2$ product and a second $H_2$-enriched gas.

3. An apparatus according to #1 or #2, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for converting $H_2S$ to elemental sulfur via reaction with $SO_2$, and (iii) conduit means for transferring at least a portion of the combustion effluent from the combustion system to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the combustion system formed from a portion of the combustion effluent.

4. An apparatus according to #1 or #2, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving and separating the combustion effluent to form an $SO_2$-enriched stream and an $SO_2$-depleted stream (iii) a system for converting $H_2S$ to elemental sulfur via reaction with $SO_2$, and (iv) conduit means for transferring the $SO_2$-enriched stream from the system for separating the combustion effluent to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the system for separating the combustion effluent formed from the $SO_2$-depleted stream.

5. An apparatus according to #1 or #2, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving combustion effluent from the combustion system, converting $SO_x$ in said effluent to sulfuric and/or sulfurous acid, and separating said acid from the effluent to form a $SO_x$-depleted combustion effluent, (iii) a system for converting $H_2S$ to elemental sulfur via reaction with sulfuric and/or sulfurous acid, and (iv) conduit means for transferring sulfuric acid and/or sulfurous acid from the $SO_x$ to acid conversion system to the $H_2S$ to elemental sulfur conversion system to provide sulfuric and/or sulfurous acid for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the $SO_x$ to sulfuric and/or sulfurous acid conversion system formed from the SOx-depleted combustion effluent.

6. An apparatus according to #5, wherein the system for converting $SO_x$ to sulfuric and/or sulfurous acid comprises a cooling system for cooling the combustion effluent to condense out water and convert $SO_3$ to sulfuric acid, a compressor for elevating the pressure of the cooled combustion effluent, and a counter current gas/liquid contact device for washing the cooled combustion effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

Solely by way of example, certain embodiments of the invention will now be described with reference to the accompanying drawings.

Referring to FIG. 1, sour syngas stream 10, comprising $H_2$, CO, $CO_2$ and $H_2S$, is fed into PSA system 12, which separates the sour syngas by pressure swing adsorption into a high pressure stream, 14, of $H_2$-enriched product gas and a low pressure stream, 16, of sour gas. The sour gas also comprises $H_2$, CO, $CO_2$ and $H_2S$, but is enriched in $CO_2$ and $H_2S$ and depleted in $H_2$ relative to the sour syngas. The $H_2$-enriched product stream 14 may be expanded in optional expander 32, prior to, for example, being sent as fuel to a gas turbine to generate power (as, for example, where the $H_2$-enriched product comprises gas turbine fuel grade purity $H_2$) or exported for chemicals or refining applications (as, for example, where $H_2$-enriched gas comprises high purity, e.g. 99.99 mole % or higher, $H_2$ product or a high purity syngas comprising a desired $H_2$/CO ratio).

Sour gas stream 16 is divided into two further streams, 18 and 24 (which, therefore, remain of the same composition as stream 16). The division of the sour gas between streams 18 and 24 is adjustable, as will be described below in further detail.

Sour gas stream 18 is fed into $H_2S$ removal system 20, which processes the stream to selectively remove all or substantially all the $H_2S$ therefrom, thereby forming stream 22 of sweetened gas which is devoid or almost devoid of $H_2S$. The $H_2S$ removal system may employ any suitable means of $H_2S$ removal, including (but not limited to) adsorption, conversion to elemental sulfur, and/or combustion. The operation of two exemplary $H_2S$ removal systems will be described in further detail below, with reference to FIGS. 2 and 3. Sour gas stream 24 bypasses the $H_2S$ removal system and is combined with sweetened gas stream 22 to form a $H_2S$-lean, $CO_2$ product gas. In the depicted embodiment streams 22 and 24 are combined to form stream 26 of $H_2S$-lean, $CO_2$ product gas, which stream is then compressed in compressor 28 prior to, optionally, being fed to a further separation system. Equally, however, streams 22 and 24 could be combined within compressor 28 to form the $H_2S$-lean, $CO_2$ product gas, or could be separately compressed and combined subsequently to form the $H_2S$-lean, $CO_2$ product gas.

The division of the sour gas between streams 18 and 24 is adjustable, so that it can be changed responsive to changes in the $H_2S$ content of the sour gas. In this way, should the $H_2S$ content of stream 16 rise, for example due to the $H_2S$ content of sour syngas stream 10 rising as a result of a change in gasifier/reformer feedstock, the flow rate of stream 18 can be increased and the flow rate of stream 24 decreased in order to keep the $H_2S$ content of the $H_2S$-lean, $CO_2$ product gas at or below a desired maximum content as dictated by the emissions and/or $CO_2$ product specifications that the process is to meet. Likewise, should the $H_2S$ content of stream 16 drop, the flow rate of stream 18 may be reduced and flow rate of stream 24 increased, up to a level at which the desired maximum $H_2S$ content of the $H_2S$-lean, $CO_2$ product gas is still not exceeded, thereby conserving resources and/or reducing costs associated with the $H_2S$ removal process.

As noted above, stream 26 of $H_2S$-lean, $CO_2$ product gas may, optionally, be compressed in compressor 28 and then fed to a further separation system. In the embodiment depicted in FIG. 1, the further separation system is a membrane separation system 30 comprising one or more membranes that are permeable to $H_2$ but relatively impermeable to $CO_2$, but other types of system, such as for example a partial condensation system, could equally be used. The compressed $H_2S$-lean, $CO_2$ product gas is separated in the membrane separation system 30 into a stream 34 of $H_2$-enriched gas, obtained at lower pressure from the permeate side of the membrane(s), and a stream 36 of $H_2S$-lean, $H_2$-lean $CO_2$ product gas obtained from the upstream side of the membrane(s). Optionally, an $N_2$ 'sweep' stream 38 is also used to increase the driving force for separation, allowing stream 34 of second $H_2$-enriched gas leaving the membrane separation system to be obtained at a higher pressure with the same membrane surface area. The second stream 34 of $H_2$-enriched gas may be blended with stream 14 of $H_2$-enriched product gas, recycled to PSA system 10 (for example by being added to sour syngas stream 10 or by being used in a rinse or repressurisation step of the PSA cycle), or used in another process. The $H_2S$-lean, $H_2$-lean $CO_2$ product stream may be compressed in compressor 40 prior to being piped for geological storage or EOR.

In the embodiment depicted in FIG. 1, sour syngas stream 10 may for example comprise about 57% $H_2$, 3% CO, 40% $CO_2$, and 100 ppm $H_2S$ (all percentages being mole %) and be introduced into PSA system at 1.2 to 6 MPa (12 at 60 bar) absolute. The $H_2$-enriched product stream 14 may comprise 95% $H_2$ and 5% CO and be obtained at the same or about the same pressure as the sour syngas feed to the PSA system (i.e. subject to any unavoidable pressure drop associated with flow through the adsorbent packed bed), and the sour gas streams 16 may comprise about 93% $CO_2$, 6.6% $H_2$, 0.4% CO, and 233 ppm $H_2S$ and be obtained at 1 bar absolute. The stream of sweetened gas produced by the $H_2S$ removal system (for example comprising a catalytic system for converting $H_2S$ to elemental sulfur, e.g. LO-CAT, followed by a ZnO bed for final polishing) may comprise about 6.6% $H_2$, 0.4% CO, 93% $CO_2$, 2 ppm $H_2S$. The $H_2S$-lean, $CO_2$ product stream 26 may comprise about 6.6% $H_2$, 0.4% CO, 93% $CO_2$ and 94 ppm $H_2S$. The second $H_2$-enriched gas may comprise 100% $H_2$ or (if an $N_2$ sweep is used) $H_2/N_2$. The $H_2S$-lean, $H_2$-lean $CO_2$ product stream 36 may comprise about 96% $CO_2$, 4% CO and 98 ppm $H_2S$, and may be compressed to a pressure of 12 MPa (120 bar) absolute.

Figure 2:
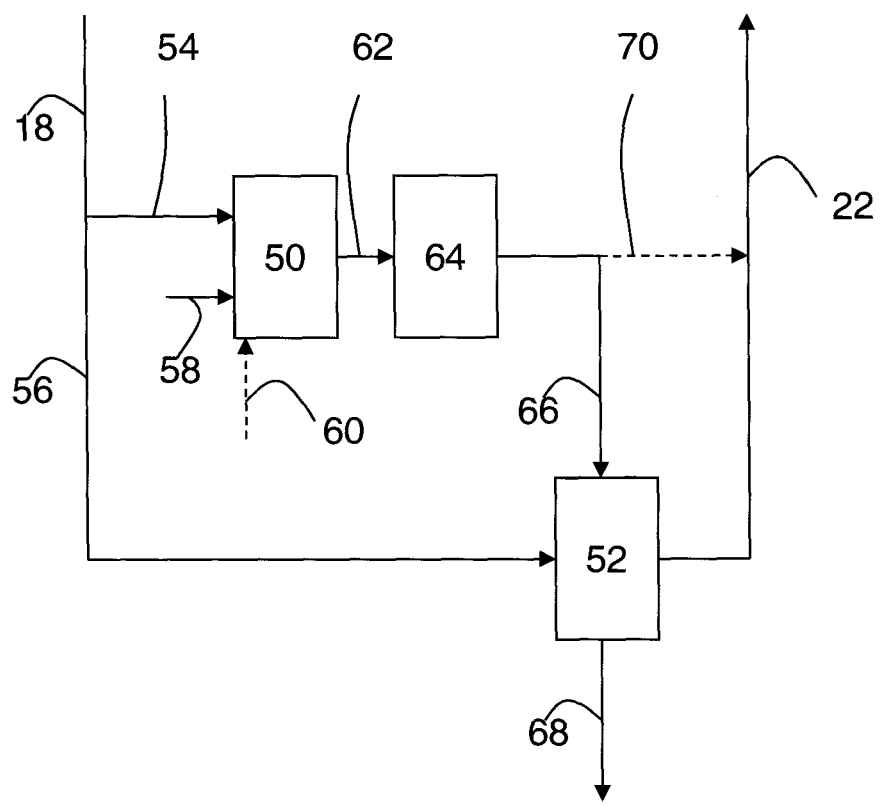
FIG. 2 is a flow sheet depicting the operation of one type of $H_2S$ removal system that may be used in the present invention.

Referring to FIG. 2, in one exemplary embodiment the $H_2S$ removal system 20 comprises both an oxy-fuel combustion system 50 and an $H_2S$ to elemental sulfur conversion system 52 comprising a catalyst that catalyses the conversion of $H_2S$ to elemental sulfur via reaction with $SO_2$.

In the depicted embodiment, sour gas stream 18 is divided into streams 54 and 56 but, equally, one or both of streams 54 and 56 could be divided from stream 16 at the same time as or before stream 24. Stream 54 is introduced into oxy-fuel combustion system 50 and combusted in the presence of oxygen, provided by high purity oxygen stream 58, so as to combust all or substantially all of the $H_2$, CO and $H_2S$ present in the stream, thereby producing a combustion effluent 62 comprising $CO_2$, $SO_x$ and $H_2O$. Optionally, additional fuel may also be supplied to and combusted in the oxy-fuel combustion system 50, as indicated by stream 60. The combustion effluent 62 is then passed to heat exchanger 64 to recover heat therefrom via indirect heat exchange.

Stream 56 of sour gas is introduced into the $H_2S$ to elemental sulfur conversion system 52 where all or substantially all of the $H_2S$ in the stream is reacted with $SO_2$ over the catalyst to produce elemental sulfur and $H_2O$ (via the reaction $2H_2S+SO_2 \rightarrow \frac{3}{8}S_8+2H_2O$) and form stream 22 of sweetened gas. The sulfur is removed as stream 68 via a sulfur handling process within the conversion system. The $SO_2$ required for this reaction is supplied by feeding at least a portion 66 of the combustion effluent 62 into the conversion system, the amount of combustion effluent fed into the conversion system preferably being such as to provide an amount of $SO_2$ sufficient for, but not significantly in excess of, the stoichiometric amount required for reaction with $H_2S$. The heat required for optimal conversion of $H_2S$ to sulfur may be supplied by the heat recovered from the combustion effluent in heat exchanger 64. Alternatively or additionally, the heat recovered from the combustion effluent in heat exchanger 64 may be put to other uses, such as for example heating stream 14 of $H_2$-enriched product gas prior to said stream being expanded in optional expander 32.

Heat exchanger 64, although depicted as a single unit, could comprise one or more heat exchangers in series or parallel. The recovery of heat from stream 62 in heat exchanger 64 could, for example be via indirect heat transfer with any or all of streams 54, 58, 60, 56, and 14 by passing said stream(s) through heat exchanger 64 also. Alternatively, a separate a heat transfer fluid (e.g. steam), could be used that is circulated through heat exchanger 64 and separate heat exchangers (not shown) associated with any or all of streams 54, 58, 60, 56, and 14 to achieve indirect heat transfer with these streams. A separate heat transfer fluid (not shown) heated by stream 62 in heat exchanger 64 could also, for example, be used to heat the catalyst beds of conversion system 52.

The stream 22 of sweetened gas obtained from conversion system 52 is then combined with stream 24 of sour gas to form the $H_2S$-lean, $CO_2$ product, as described above with reference to FIG. 1. Water present in the sweetened gas can be removed prior to or after combining the stream with stream 24 of sour gas. For example, water may be removed during compression of the stream(s) in compressor 28. A further portion of the combustion effluent 62 may optionally also be taken as a second, $SO_x$ containing, stream 70 of sweetened gas. This second stream of sweetened gas may be combined with the stream of sweetened gas from conversion system 52 as shown in FIG. 2, or the two streams of sweetened gas may be separately added to stream 24 of sour gas to form the $H_2S$-lean, $CO_2$ product. Where, in particular, a second stream 70 of sweetened gas is formed from a portion of the combustion effluent, it is preferable that both the division of sour gas between the streams, 54 and 56, fed to the oxy-combustion and conversion systems, 50 and 52, and the division of the combustion effluent 62 between being sent to the conversion system 52 and being taken as the second stream 70 of sweetened gas, are adjustable so that both the desired reaction stoichiometry within the conversion system 52 and desired limits on $SO_x$ content of the $H_2S$-lean, $CO_2$ product gas can be maintained in the event of a change in the $H_2S$ content of the sour gas streams 16, 18, 24, 54 and 56.

In the arrangement depicted in FIG. 2, sour gas streams 18, 54 and 56 may for example comprise about 93% $CO_2$, 6.6% $H_2$, 0.4% CO, and 233 ppm $H_2S$. Combustion effluent 62 may comprise about 99% $CO_2$ and 235 ppm $SO_x$. Stream 22 of sweetened gas may comprise about 96% $CO_2$ and 4% $H_2/CO_2$ (a second stream 70 of sweetened gas not, in this example, being formed from the combustion effluent). The $H_2S$-lean, $CO_2$ product stream 26 may then comprise about 5.2% $H_2$, 0.8% CO, 94% $CO_2$ and 71 ppm $H_2S$, and the $H_2S$-lean, $H_2$-lean $CO_2$ product stream 36 may comprise about 99% $CO_2$, 1% CO and 76 ppm $H_2S$. All the above figures are calculated on a dry basis.

Figure 3:
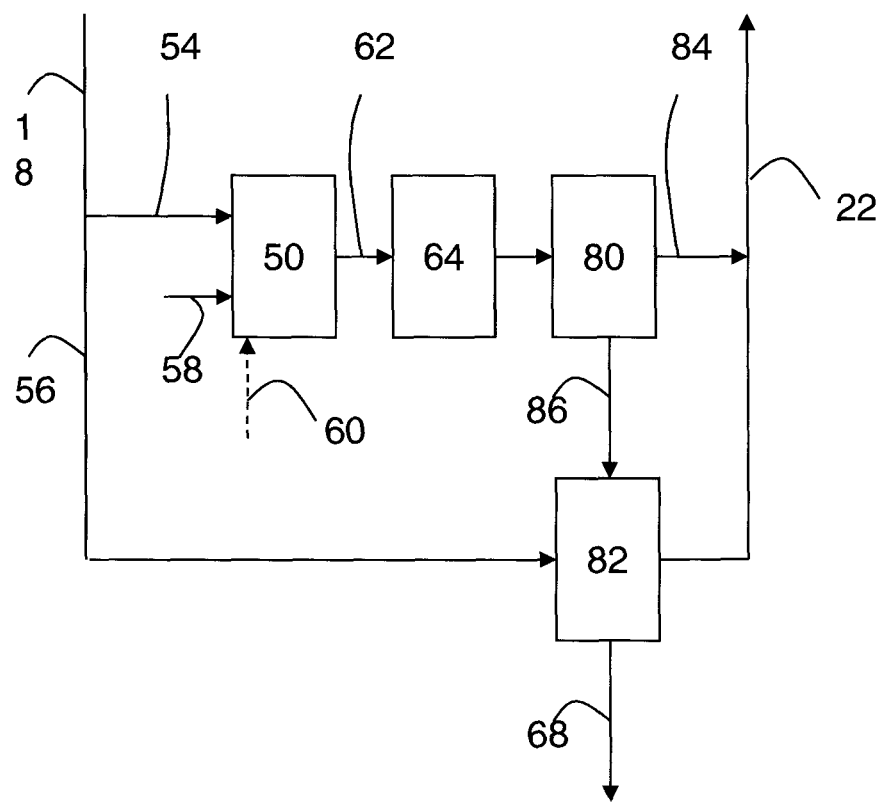
FIG. 3 is a flow sheet depicting the operation of an alternative type of $H_2S$ removal system that may be used in the present invention.

Referring to FIG. 3, an alternative exemplary embodiment of the $H_2S$ removal system is shown, the same reference numerals being used in FIG. 3 as in FIG. 2 to denote common features. The removal system 20 in this embodiment comprises both an oxy-fuel combustion system 50 and an $H_2S$ to elemental sulfur conversion system 82 in which $H_2S$ is converted to elemental sulfur via reaction with sulfuric acid ($H_2SO_4$) and/or sulfurous acid ($H_2SO_3$). Streams 54 and 56 of sour gas are, again, fed to the combustion system 50 and conversion system 82, respectively, the combustion system 50 combusting all or substantially all of the $H_2$, CO and $H_2S$ in sour gas stream 54 to form combustion effluent 62 comprising $CO_2$, $SO_x$ and $H_2O$, and the conversion system 82 converting all or substantially all of the $H_2S$ in the sour gas stream 56 to elemental sulfur to provide stream 22 of sweetened gas and stream 68 of sulfur. Combustion effluent 62 is, again, passed through heat exchanger 64 to recover heat therefrom via indirect heat exchange.

In this arrangement, however, the combustion effluent 62 exiting heat exchanger 64 is introduced into $SO_x$ to acid conversion system 80 where it is cooled (in a further heat exchanger), compressed and maintained at elevated pressure, in the presence of $O_2$, water and optionally $NO_x$, to convert all or substantially all of the $SO_x$ in the combustion effluent to $H_2SO_4$ and/or $H_2SO_3$, thereby forming a further stream 84 of sweetened gas and a stream 86 of aqueous $H_2SO_4$ and/or $H_2SO_3$. At least a portion of this acid (optionally, after evaporation of some of the water to obtain a more concentrated solution of acid) is then introduced into the $H_2S$ to elemental sulfur conversion system 82, the amount of acid fed into the conversion system preferably being at least sufficient to provide the stoichiometric amount $H_2SO_4$ and/or $H_2SO_3$ required for conversion of all of the $H_2S$ in sour gas stream 56, which proceeds according to the reactions $3H_2S(g)+H_2SO_4(l) \rightarrow 4S+4H_2O(l)$ and $2H_2S(g)+H_2SO_3(l) \rightarrow 3S+3H_2O(l)$.

The heat recovered from the combustion effluent in heat exchanger 64 may again be supplied to the $H_2S$ to elemental sulfur conversion system 82 as required for optimal conversion of $H_2S$, and/or put to other uses. The streams of sweetened gas 84 and 22 obtained from the $SO_x$ to acid conversion system 80 and $H_2S$ to elemental sulfur conversion system 82 may be combined, as shown in FIG. 3, prior to being combined with sour gas stream 24 to form the $H_2S$-lean, $CO_2$ product, or the two streams of sweetened gas may be separately added to stream 24 of sour gas.

It will be appreciated that the invention is not restricted to the details described above with reference to the preferred embodiments but that numerous modifications and variations can be made without departing form the spirit or scope of the invention as defined in the following claims.

The invention claimed is:

1. Apparatus for treating a feed gas, comprising $CO_2$, $H_2S$ and $H_2$, to produce an $H_2$-enriched product gas and an $H_2S$-lean, $CO_2$ product gas, the apparatus comprising:
  a pressure swing adsorption (PSA) system for separating the feed gas to form a stream of $H_2$-enriched product gas and a stream of sour gas, the sour gas comprising $CO_2$, $H_2S$ and $H_2$ but being depleted in $H_2$ and enriched in $H_2S$ and $CO_2$ relative to the feed gas;
  an $H_2S$ removal system for processing a part of the sour gas to form one or more streams of sweetened gas, depleted in $H_2S$ and enriched in $CO_2$ relative to the feed gas;

conduit means for transferring a part of said sour gas into the $H_2S$ removal system and bypassing the $H_2S$ removal system with another part of said sour gas;

a valve system for adjustably controlling the division of said sour gas between being sent to the $H_2S$ removal system and bypassing said system; and conduit means for withdrawing one or more streams of sweetened gas from the $H_2S$ removal system, and combining said stream(s) with the sour gas bypassing the $H_2S$ removal system to form $H_2S$-lean, $CO_2$ product gas.

2. An apparatus according to claim 1, wherein the apparatus further comprises a separation system for receiving the $H_2S$-lean, $CO_2$ product gas and separating said gas to form an $H_2S$-lean, $H_2$-lean, $CO_2$ product and a second $H_2$-enriched gas.

3. An apparatus according to claim 1, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for converting $H_2S$ to elemental sulfur via reaction with $SO_2$, and (iii) conduit means for transferring at least a portion of the combustion effluent from the combustion system to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the combustion system formed from a portion of the combustion effluent.

4. An apparatus according to claim 1, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving and separating the combustion effluent to form an $SO_2$-enriched stream and an $SO_2$-depleted stream (iii) a system for converting $H_2S$ to elemental sulfur via reaction with $SO_2$, and (iv) conduit means for transferring the $SO_2$-enriched stream from the system for separating the combustion effluent to the $H_2S$ to elemental sulfur conversion system to provide $SO_2$ for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the system for separating the combustion effluent formed from the $SO_2$-depleted stream.

5. An apparatus according to claim 1, wherein:

the $H_2S$ removal system comprises (i) a combustion system, for combusting sour gas in the presence of $O_2$ to produce heat and a combustion effluent depleted in $H_2S$ and $H_2$ and comprising $CO_2$, $SO_x$ and $H_2O$, (ii) a system for receiving combustion effluent from the combustion system, converting $SO_x$ in said effluent to sulfuric and/or sulfurous acid, and separating said acid from the effluent to form an $SO_x$-depleted combustion effluent, (iii) a system for converting $H_2S$ to elemental sulfur via reaction with sulfuric and/or sulfurous acid, and (iv) conduit means for transferring sulfuric and/or sulfurous acid from the $SO_x$ to acid conversion system to the $H_2S$ to elemental sulfur conversion system to provide sulfuric and/or sulfurous acid for reaction with $H_2S$;

the conduit means for transferring a part of the sour gas into the $H_2S$ removal system transfer a stream of sour gas into the combustion system and a stream of sour gas into the $H_2S$ to elemental sulfur conversion system; and the conduit means for withdrawing one or more streams of sweetened gas from the $H_2S$ removal system withdraw a stream of sweetened gas from the $H_2S$ to elemental sulfur conversion system and, optionally, a stream of sweetened gas from the $SO_x$ to sulfuric and/or sulfurous acid conversion system formed from the $SO_x$-depleted effluent.

6. An apparatus according to claim 5, wherein the system for converting $SO_x$ to sulfuric and/or sulfurous acid comprises a cooling system for cooling the combustion effluent to condense out water and convert $SO_3$ to sulfuric acid, a compressor for elevating the pressure of the cooled combustion effluent, and a counter current gas/liquid contact device for washing the cooled combustion effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

* * * * *